(12) United States Patent
Burakou

(10) Patent No.: US 10,334,226 B2
(45) Date of Patent: Jun. 25, 2019

(54) VISION SYSTEM WITH AUTOMATIC CALIBRATION

(71) Applicant: APEX BRANDS, INC., Apex, NC (US)

(72) Inventor: Aliaksandr Burakou, Troy, MI (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 15/743,843

(22) PCT Filed: Jul. 15, 2016

(86) PCT No.: PCT/US2016/042482
§ 371 (c)(1),
(2) Date: Jan. 11, 2018

(87) PCT Pub. No.: WO2017/015105
PCT Pub. Date: Jan. 26, 2017

(65) Prior Publication Data
US 2018/0205935 A1    Jul. 19, 2018

Related U.S. Application Data

(60) Provisional application No. 62/193,804, filed on Jul. 17, 2015.

(51) Int. Cl.
*H04N 13/00* (2018.01)
*H04N 7/18* (2006.01)
(Continued)

(52) U.S. Cl.
CPC .......... *H04N 13/239* (2018.05); *B25J 9/1692* (2013.01); *B25J 9/1697* (2013.01);
(Continued)

(58) Field of Classification Search
CPC ............... H04N 13/239; H04N 13/246; H04N 2013/0081; H04N 7/18; H04N 7/181;
(Continued)

(56) References Cited

U.S. PATENT DOCUMENTS 5,703,604 A * 12/1997 McCutchen ........... G09G 3/003
348/36

FOREIGN PATENT DOCUMENTS

EP    1415609 A1    5/2004
EP    2835703 A1    2/2015
WO    2006091494 A1    8/2006

OTHER PUBLICATIONS

So, Edmond Wai Yan, et al., "Real-Time 3D Model Reconstructions with a Dual-Laser Traingulation System for Assembly Line Completeness Inspection," 7th International Conference on Knowledge Management in Organizations: Service and Cloud Computing, vol. 2, published Jun. 26, 2012, all enclosed pages cited.
(Continued)

*Primary Examiner* — Sherrie Hsia
(74) *Attorney, Agent, or Firm* — Burr Forman McNair

(57) ABSTRACT

A vision system may include a first camera and a second camera mounted for stereoscopic monitoring of a work environment, a support platform for support of a workpiece in the work environment, a first reference plate operably coupled to the support platform to provide a first frame of reference for three dimensional location of objects in the work environment, a power tool operable in the work environment under control of a tool controller, and a motion monitor operably coupled to the first and second cameras to determine location of the tool in the work environment based on a comparison of a reference point on the tool to a position of reference points on the reference plate. A perspective view of the support platform by the first and second cameras may be changeable, and the system may further
(Continued)

include a second reference plate to define a second frame of reference for three dimensional location of objects responsive to the perspective view of the support platform being changed.

20 Claims, 6 Drawing Sheets

(51) Int. Cl.
    *H04N 13/239*    (2018.01)
    *B25J 9/16*    (2006.01)
    *H04N 13/246*    (2018.01)
    *G05B 19/401*    (2006.01)

(52) U.S. Cl.
    CPC ......... *G05B 19/401* (2013.01); *H04N 13/246* (2018.05); *G05B 2219/37074* (2013.01); *G05B 2219/37559* (2013.01); *G05B 2219/40557* (2013.01); *H04N 2013/0081* (2013.01)

(58) Field of Classification Search
    CPC ..... B25J 9/1692; B25J 9/1697; G05B 19/401; G05B 2219/37074; G05B 2219/37559; G05B 2219/40557; G06T 2207/10016; G06T 2207/10012; G06T 7/0075; A61B 4/30; A61B 17/1676; A61B 17/1695
    USPC ........... 348/129, 42, 47, 135, 139, 142, 169; 382/103, 154; 702/85, 94; 600/202
    See application file for complete search history.

(56) References Cited

OTHER PUBLICATIONS

International Search Report and Written Opinion of PCT/US2016/042482 dated Nov. 28, 2016, all enclosed pages cited.

Chapter I International Preliminary Report on Patentability of PCT/US2016/042482 dated Jan. 23, 2018, all enclosed pages cited.

* cited by examiner

VISION SYSTEM WITH AUTOMATIC CALIBRATION

CROSS-REFERENCE TO RELATED APPLICATIONS

This application claims the benefit of U.S. Provisional Application No. 62/193,804 filed on Jul. 17, 2015, the entire contents of which are hereby incorporated herein by reference.

TECHNICAL FIELD

Example embodiments generally relate to employment of a vision system in connection with the operation of power tools and, in particular, relate to such a system that can be automatically calibrated during operation.

BACKGROUND

Power tools are commonly used across all aspects of industry. Power tools are employed for multiple applications including, for example, drilling, tightening, sanding, and/or the like. Handheld power tools are often preferred, or even required, for jobs that require a high degree of freedom of movement or access to certain difficult to reach objects.

In some contexts, various operations are conducted by humans or machines using power tools as part of a comprehensive assembly process. For example, power tools may be employed to tighten fasteners at various locations along an assembly line for assembling engine parts. These assembly processes may include tightening operations that must be performed in specific orders and/or to specific specifications. Invariably, when humans conduct these operations in a repetitive fashion, some tightening operations may be conducted out of order or to the wrong torque specification.

Accordingly, it may be desirable to improve the ability of a vision system to identify specific locations on an object and allow a tool to be applied to such locations (e.g., for tightening). However, because the assembly line environment presents a moving target, and because the object may need to be operated upon from various different directions, such an improved vision system can be extremely complex to realize.

BRIEF SUMMARY OF SOME EXAMPLES

Some example embodiments may enable the provision of a vision system that can effectively be employed with respect to a power tool that can be employed in the context described above.

In an example embodiment, a vision system is provided. The vision system may include a first camera and a second camera mounted for stereoscopic monitoring of a work environment, a support platform for support of a workpiece in the work environment, a first reference plate operably coupled to the support platform to provide a first frame of reference for three dimensional location of objects in the work environment, a power tool operable in the work environment under control of a tool controller, and a motion monitor operably coupled to the first and second cameras to determine location of the tool in the work environment based on a comparison of a reference point on the tool to a position of reference points on the reference plate. A perspective view of the support platform by the first and second cameras may be changeable, and the system may further include a second reference plate to define a second frame of reference for three dimensional location of objects responsive to the perspective view of the support platform being changed.

In another example embodiment, the vision system may include a first camera and a second camera mounted for stereoscopic monitoring of a work environment. The vision system may further include a support platform for support of a workpiece in the work environment and a reference plate operably coupled to the support platform to provide a frame of reference for three dimensional location of objects in the work environment. The vision system may further include a power tool operable in the work environment under control of a tool controller, and a motion monitor operably coupled to the first and second cameras to determine location of the tool in the work environment based on a comparison of a reference point on the tool to a position of reference points on the reference plate. The reference plate may include at least four reference points distributed thereon. The motion monitor may be configured to perform automatic configuration based on the at least four reference points using the same spectrum used to determine the location of the tool.

In still another example embodiment, the vision system may include a first camera and a second camera mounted for stereoscopic monitoring of a work environment, a support platform for support of a workpiece in the work environment, and a reference plate operably coupled to the support platform to provide a frame of reference for three dimensional location of objects in the work environment. The vision system may further include a power tool operable in the work environment under control of a tool controller, and a motion monitor operably coupled to the first and second cameras to determine location of the power tool in the work environment based on a comparison of a reference point on the tool to a position of reference points on the reference plate. The motion monitor may be configured to monitor the location of the power tool relative to a movement zone defining a volume in three dimensional space.

In yet another example embodiment, the vision system may include a first camera and a second camera mounted for stereoscopic monitoring of a work environment, a support platform for support of a workpiece in the work environment, and a reference plate operably coupled to the support platform to provide a frame of reference for three dimensional location of objects in the work environment. The vision system may further include a plurality of power tools operable in the work environment under control of at least one tool controller, and a motion monitor operably coupled to the first and second cameras to determine location of the power tools in the work environment based on a comparison of a reference point on the tool to a position of reference points on the reference plate.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
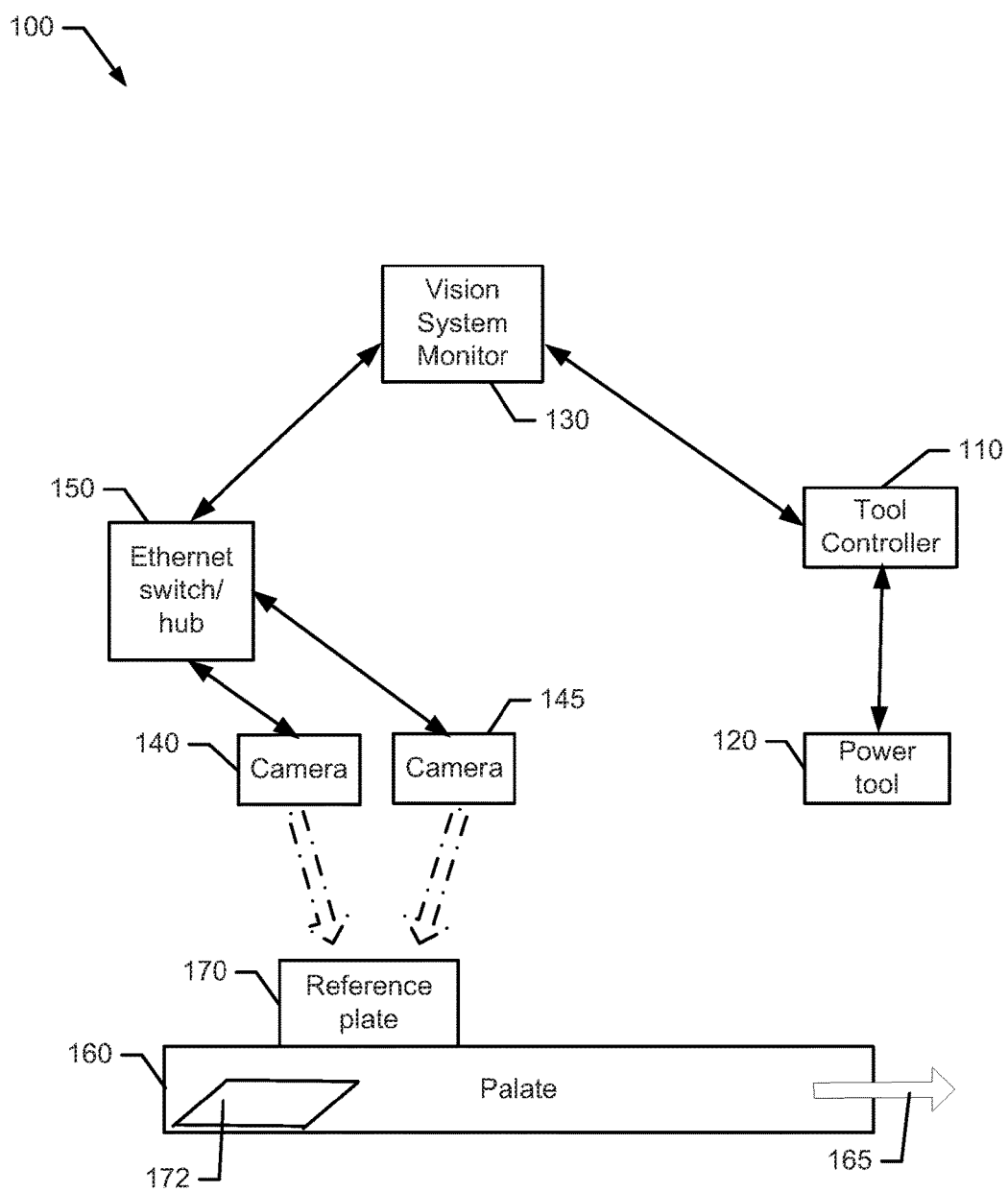
FIG. 1 illustrates a functional block diagram of a system that may be useful in connection with providing a system and power tool according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a vision system that can integrate with operation of highly capable power tools that also have superior characteristics relative to granting access to certain areas. A power tool may therefore be employable on a moving assembly line such that the vision system can track the movement of the power tool and institute process controls thereon. In some embodiments, the vision system may further be enabled to be calibrated during operation via an automated process. This may represent a significant improvement over prior calibration processes that may be performed offline and/or may require using one spectrum (e.g., visible light spectrum) for calibration, while using a different spectrum (e.g., infrared (IR) spectrum) during operation. FIG. 1 illustrates a functional block diagram of a system that may be useful in connection with providing a vision system and corresponding power tool according to an example embodiment.

As shown in FIG. 1, a system 100 of an example embodiment may include a tool controller 110 that is configured to interface with (and enable control of) a power tool 120. The power tool 120 may be a corded (or cordless) hand tool such as a right angle tightening device, or any of a number of other power tools configured for fastening, material removal, assembly, or the like. Thus, for example, the tool controller 110 may be configured to interface with the power tool 120 to provide instructions or control over operation of the power tool 120 to tighten to specification, enable operation only if the correct order of operations is followed and/or the correct recipient of torque is engaged, and/or the like.

The system 100 may further include a vision system monitor 130, which may include a monitor (e.g., of a personal computer (PC) and/or other processing and display components. The vision system monitor 130 may be operably coupled to the tool controller 110 and to at least two cameras (e.g., first camera 140 and second camera 145) via an Ethernet switch/hub 150. In some cases, the tool controller 110 may also be operably coupled to the Ethernet switch/hub 150.

The first and second cameras 140 and 145 may be configured to provide image data by capturing video of an area simultaneously from different vantage points. This provides stereo image data that can be processed using frame processing technology to enable three dimensional (3D) data to be generated for the area within the field of vision of the first and second cameras 140 and 145. In an example embodiment, the vision system monitor 130 may include processing circuitry that is configured to handle the frame processing of image data captured by the first and second cameras 140 and 145. Meanwhile, tool controller hardware and vision firmware may be provided at the tool controller 110.

The first and second cameras 140 and 145 may be statically mounted in the vicinity of an assembly line along which a palate 160 carrying an object (e.g., an engine to be assembled) is movable. The distance between the first and second cameras 140 and 145 and the palate 160 may generally be known. The palate 160 may move in the direction of arrow 165 and various fasteners on the object may require tightening via the power tool 120. As shown in FIG. 1, the first and second cameras 140 and 145 may be configured to obtain 3D data to be provided to the vision system monitor 130 while the tool controller 110 may pass 2D data from the power tool 120 to the vision system monitor 130. By adding the output of an active or passive reference plate (e.g., reference plate 170), the third dimension of tool position may be calculated. Accordingly, the reference plate 170 may be attached to the palate 160 to enable 3D tool position to be determined.

The reference plate 170 could be active (e.g., having LEDs or other illuminated or transmitting objects thereon) or passive (e.g., having one or more symbols or reference points marked on a surface of the reference plate 170. In either case, reference points provide a 3D reference perspective through the first and second cameras 140 and 145. In some cases, at least three reference points may be provided on the surface of the reference plate 170. The reference points may be arranged in a triangular pattern with each of the reference points forming a vertex of the triangular pattern. In some examples, a fourth reference point may be provided on the reference plate 170 to further facilitate calibration operations for the system 100. In this regard, the fourth reference point may be provided along one of the edges of the triangular pattern formed by the other three reference points. For example, the fourth reference point could be provided along the longest edge (e.g., the hypotenuse) of the triangular pattern. However, in other examples, the fourth reference point may be provided at a location outside the triangular pattern. Thus, for example, the fourth reference point may, when combined with the other three reference points, be a vertex of a quadrilateral such as a rectangle, trapezoid and/or the like.

Of note, FIG. 1 shows reference plate 170 attached to the palate 160, and some embodiments may operate only with a single reference plate. However, in some case, a second reference plate 172 (or multiple additional reference plates) may be provided with different positions and/or orientations on the palate 160 and relative to the object on the palate 160. Thus, in some cases, for example where the object is a large engine with assembly operations to be performed at various locations and orientations thereon, the palate 160 itself may be rotated to provide access and visibility to other portions of the object. The second reference plate 172 may be provided to enable good visibility after the perspective change caused by rotation of the palate 160 occurs. Thus, in some cases, a first reference plate may operably coupled to the palate 160 to lie in a first plane, and the second reference plate may be operably coupled to the palate 160 to lie in a second plane that is different than the first plane. In some cases, both the first plane and the second plane may extend substantially parallel to the direction of motion of the palate 160. In an example embodiment, the first plane and the second plane may be provided at an angle relative to each other, and the angle may be substantially equal to the amount of rotation of the palate 160.

Figure 2A:
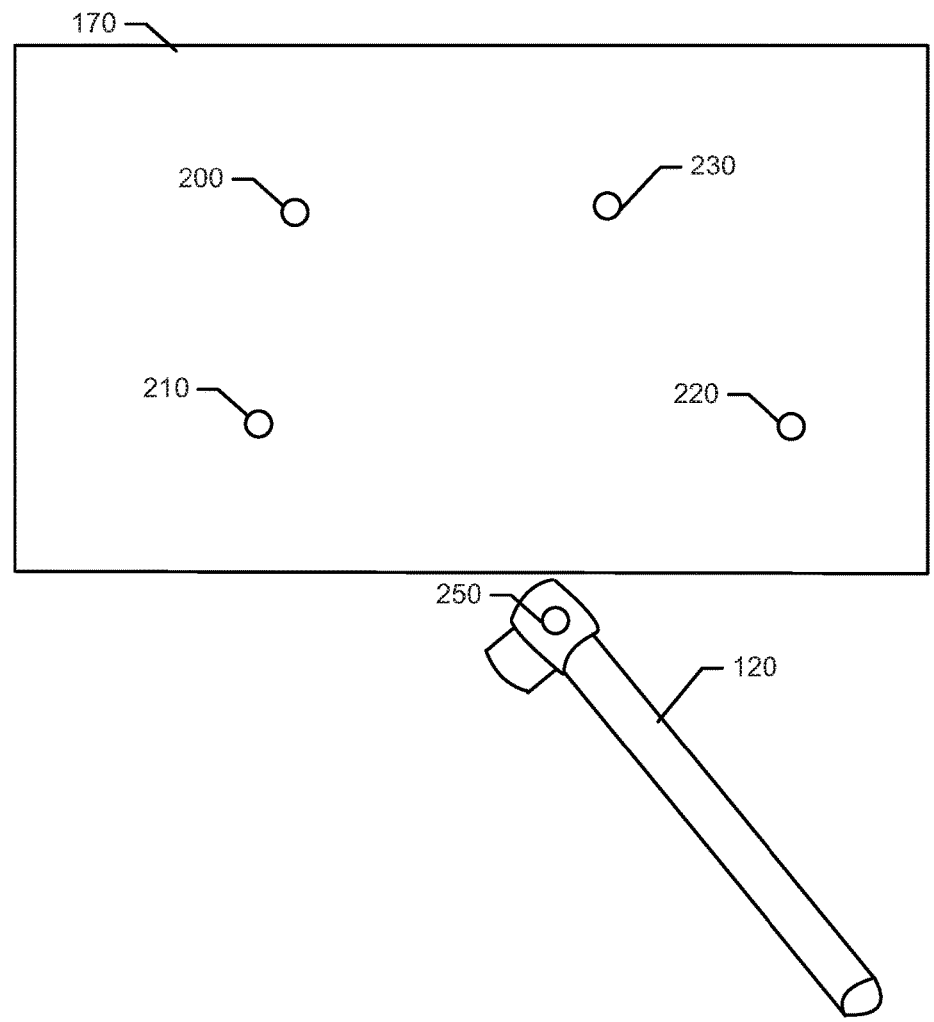
FIG. 2A illustrates a reference plate defining a reference quad and a power tool that can be tracked in a 3D environment using the reference plate according to an example embodiment.

The reference plate 170, and the techniques used to perform localization of the tool using the reference plate 170, may be different in some examples. However, generally, reference points on the reference plate may be used to facilitate defining a location of another reference point (or object) in three dimensional space. FIG. 2A illustrates an example reference plate arrangement for an active reference plate. As shown in FIG. 2A, the reference plate 170 may include LEDs (e.g., a first LED 200, a second LED 210, a third LED 220 and a fourth LED 230) provided thereon as reference points. However, it should be appreciated that passive tags (e.g., a distinctively colored, shaped or reflective object) could be substituted for the LEDs in some cases. The LEDs are arranged to form a trapezoidal shape. Generally, three of the reference points are needed to define at least reference triplet. The reference triplet can be used to evaluate a position (and orientation) of the reference plate 170 and the power tool 120. By providing the trapezoidal shape including a fourth reference point, the system 100 may be enabled to perform an automatic configuration in the same spectrum that is used for operation. The addition of the four reference point may define a reference quad. In any case, whether three or four points are employed, the reference triple or reference quad may be generally referred to as a reference shape.

In some embodiments, the vision system monitor 130 (or the tool controller 110) may monitor a location of the LEDs to execute, using stereoscopic image processing techniques, a procedure for locating the power tool 120. In particular, in some cases, the power tool 120 may further include a tool reference light or point (e.g., fifth LED 250) that can also be tracked. The fifth LED 250 may be operably coupled to the power tool 120 via a bracket that attaches to the power tool 120 near the socket or at another part of the power tool 120. In some cases, the bracket may also support the battery of the fifth LED 250. Generally speaking, the system may enable a series of operating points $L_1 \ldots L_n$, to be tracked after an initialization or calibration procedure. The calibration procedure may then be repeated routinely or repeatedly during the process of tracking the tool reference point relative to the reference shape. The calibration procedure employs calibration data stored at the vision system monitor 130 that are a function of the positioning of the first and second cameras 140 and 145, and enable a correction to be made in order to operate with the first and second cameras 140 and 145 in a condition of epipolarity. Thereafter, a characterization of the working environment is performed to define a position (x, y, z) of each of the three light sources of the reference triple (or four positions for the reference quad). This may define an operating sequence to be carried out. On the basis of the calibration file and of the characterization obtained, a tracking procedure is executed. The tracking procedure tracks the positions of the operating points of the reference triplet (or quad) and the tool reference light continuously while the power tool 120 is moving. On the basis of these positions, a point $L_{min}$ closest to the position of the power tool 120 may also be calculated. If the distance is less than a given threshold, the power tool 120 is determined to be located at an operating point $L_{min}$, and, for example, can carry out the operation, such as tightening. When the reference quad is employed, instead of a reference triplet, the fourth LED location can be used to enable auto calibration during the tracking process (or in between tracking processes) while the assembly line operates (e.g., such that the palate 160 is moving). Moreover, the same frequency spectrum can be used for both calibration processes and for tracking processes.

In an example embodiment in which more than one reference plate is used (e.g., the reference plate 170 and the second reference plate 172), the reference plates may be distinguished from each other based on different geometrical configurations provided by the LED (or reference point) locations on the corresponding reference plates. Thus, for example, the first reference plate 170 may have a particular arrangement (e.g., the trapezoidal arrangement of FIG. 2A) for the first LED, 200, the second LED 210, the third LED 220 and the fourth LED 230.

In an example embodiment, the position of the reference triple may be evaluated during operation based on IR spectrum data. Previously, calibration of the vision system was performed using visible light while the system 100 was offline. Then, to bring the system online after calibration, a switch to IR operation was needed. This process was inefficient and prevented online calibration. By employing the fourth reference point, the system 100 can perform the calibration also in the IR spectrum so there is no need to switch between spectrums when shifting from calibration to operational modes. This further means that calibration can be performed during normal operation of the system 100. In this regard, the reference triple may be used to track tool position during tightening operations performed on the object as the palate 160 moves along with the reference plate 170. However, data incorporating the fourth reference point may be used for calibration during the performance of the tightening operations. Offline calibration may still be performed, but even if offline calibration is desired or required, the frequency of offline calibration may be greatly reduced.

In some cases, during the tracking mode, it may be possible to determine the location of a particular item (e.g., such as a bolt location) and register the bolt location (e.g., relative to the reference triplet or quad) to attempt to move the tool location (e.g., as indicated by the location of the fifth LED 250 relative to the reference triplet or quad) to match the bolt location. However, when the fifth LED 250 is used to define the tool reference position, the position of the tool does not include any information indicative of the direction of extension of the socket or adapter to which the socket is attached. Thus, to provide additional information that may allow inferences to be made regarding socket or adapter orientation, an alternative or additional indicator may be employed. In this regard, for example, a linear indicator may be provided on the socket or adapter of the tool as shown in FIG. 2B.

Figure 2B:
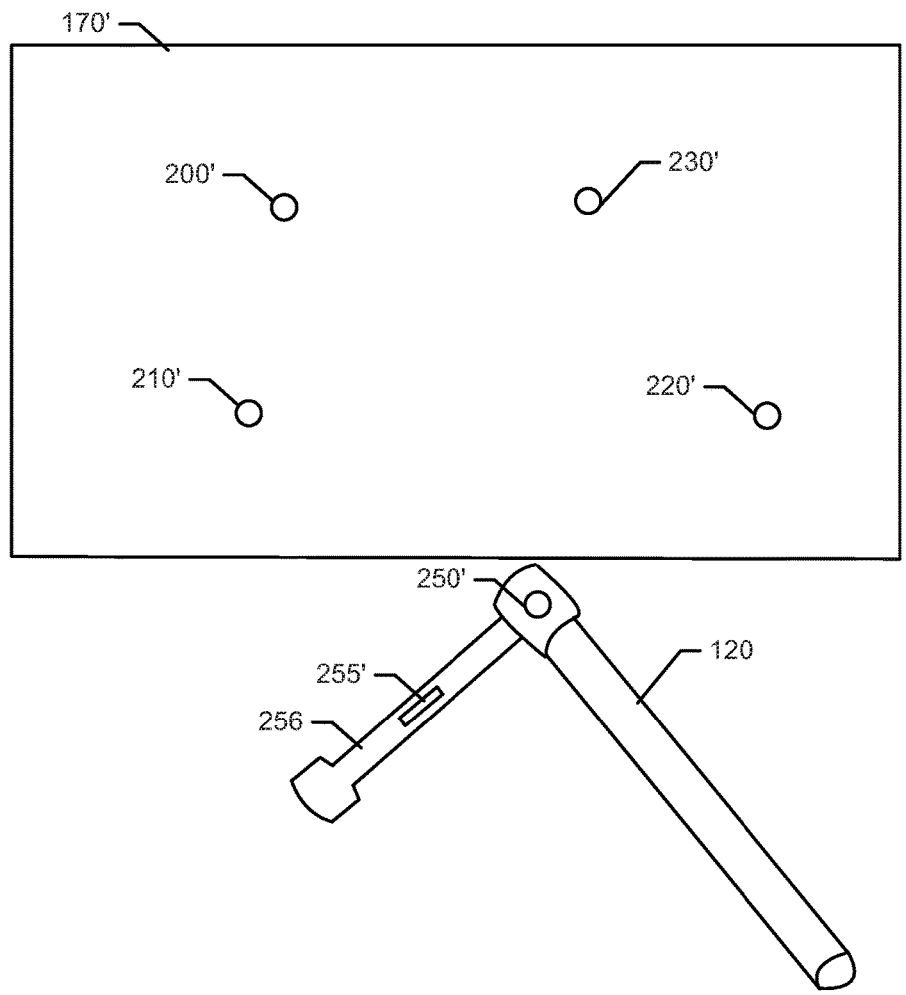
FIG. 2B illustrates similar tracking of a power tool in a slightly different context than that of FIG. 2A according to an example embodiment.

In the example of FIG. 2B, some other potential modifications to the system of FIG. 2A are also demonstrated. In this regard, for example, the LEDs of FIG. 2A may be replaced with reflective spheres so that powered LEDs need not be employed. Thus, for example, reference plate 170' may have a particular arrangement (e.g., the trapezoidal arrangement of FIG. 2B) for a first reflective sphere 200', a second reflective sphere 210', a third reflective sphere 220', and a fourth reflective sphere 230'. The power tool 120 may be provided also with an unpowered reflector such as fifth reflective sphere 250'. However, in order to allow information about directionality of the working end of the power tool 120 (e.g., via the orientation of the socket or adapter), a linear indicator 255' may also be provided on a socket or adapter 256 of the power tool 120.

In an example embodiment in which reflective components are used instead of LEDs, an illuminator may be provided to illuminate the reflective components so that the camera(s) can detect the reflected light from the reflective components. Thus, a passive vision system may be created using reflective materials instead of active emitters. High gain reflective tape may be used to embody the linear indicator 255' in some cases. Moreover, in some examples, given that the reflective tape can only reflect light to the camera with certain angles being present between the illuminator, reflective tape and camera(s), further efforts may be taken to ensure that the reflective tape can be detected from multiple angles. Thus, for example, a ring may be provided on the socket or adapter 256, and the ring may be covered with the reflective tape to that the ring (and therefore the reflective tape) is detectable at any angle.

The reflective tape may form the linear indicator 255' to have a quadrilateral shape (e.g., rectangular). Because the quadrilateral has one dimension (e.g., length) that is longer than the other (e.g., width), directional information may be indicated by the linear indicator 255'. In some cases, having the directional indication provided by the linear indicator 255' may further assist in inferring bolt location, or enabling guidance to match bolt location with socket location. Moreover, in some cases, after having the indication of the direction of extension of the socket or adapter 256, information that is stored regarding the length of the socket or adapter 256 may be retrieved to enable even more accurate locationing to be performed.

Although the addition of information indicative of the direction of extension of the socket or adapter 256 may be helpful in improving accuracy of the tracking, it should also be appreciated that some matching errors may occur, and therefore need to be dealt with, when multiple cameras are employed. In this regard, for example, if left and right cameras are employed, the images may not precisely align with each other due to epipolar errors associated with the cameras having different views of objects that may have protrusions that obscure different portions of the object for each camera. For example, since the socket or adapter 256 is generally a cylindrical object, different views of the object would be obtained by left and right cameras for any set of images captured by the cameras. To handle these differences, some example embodiments may employ a matching algorithm.

In an example embodiment, the matching algorithm may match corners of the object (e.g., corners of the quadrilateral). In this regard, the matching algorithm may be configured to handle the epipolar error by shifting the left part of the quadrilateral in the left image, and the right part of the quadrilateral in the right image to match the corners of the object to reduce the epipolar error. Directional errors may therefore be reduces, and bolt location can be pinpointed with greater accuracy.

Example embodiments discussed above may be used to create an active or passive object tracking system where the reference plates are used to allow location determination and, in some cases, automatic calibration. However, it may be difficult to determine where or how to place reference plates effectively in some environments. To deal with this difficulty, some example embodiments may actually use the physical context in which the tools are employed as the reference plates. In other words, for example, when an engine block is the context in which tracking is to be performed, portions of the engine block may be used to define the reference plate. Thus, for example, the shape of the engine itself (e.g., its outline) may be used as a reference. Other key points on the engine block may also be used to define reference points when certain structures are easily detectable as such key points. However, it may also be possible to temporarily mount reflective spheres, tape or other structures to specific portions of the engine block to define the key points. However, it should be appreciated that the use of key points on engine structures may also cause occlusion error and epipolar errors as described above. Thus, matching algorithms may be needed to account for such errors.

Figure 3:
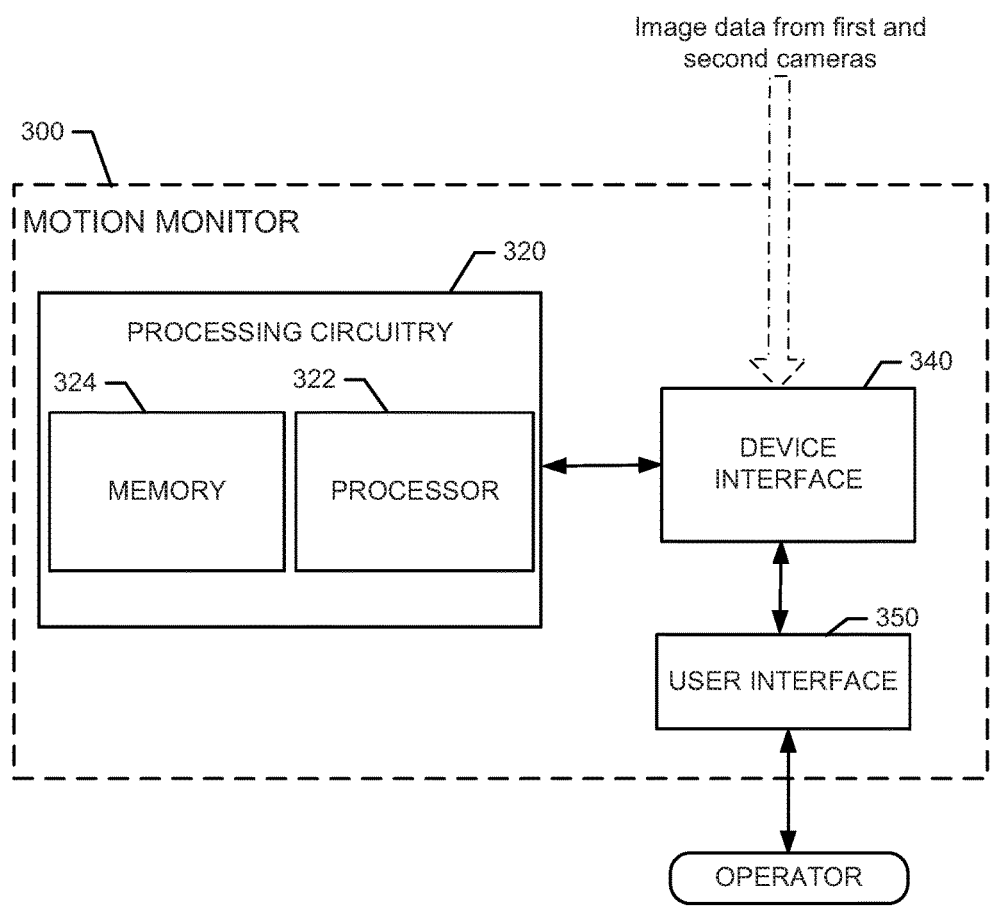
FIG. 3 illustrates a block diagram of a motion monitor in accordance with an example embodiment.

As discussed above, the location of a particular item (e.g., such as a bolt location) can be determined during the tracking mode and the bolt location (e.g., relative to the reference triplet or quad) can be registered to attempt to move the tool location (e.g., as indicated by the location of the fifth LED 250 relative to the reference triplet or quad) to match the bolt location. However, in accordance with an example embodiment, the vision system monitor 130 or the tool controller 110 may employ a motion monitor 300 to enable learning of proper tool movement that is exhibited relative to fastening of individual bolts so that the motion employed by the operator can be tracked to ensure that the motion is proper for a given bolt. FIG. 3 illustrates a block diagram of the motion monitor 300 in accordance with an example embodiment.

As shown in FIG. 3, the motion monitor 300 may include or otherwise be in communication with the processing circuitry 320 that is configurable to perform actions in accordance with example embodiments described herein. As such, for example, at least some of the functions attributable to the motion monitor 300 may be carried out by or otherwise instructed by the processing circuitry 320. The processing circuitry 220 may provide the hardware that is programmed or that hosts software to configure the system for machine learning and/or machine driven analysis techniques consistent with example embodiments. In this regard, position determinations (e.g., based on the positions of the tool relative to the reference triplet or quad, bolt location, and/or the locations of other objects of interest) may therefore be accomplished using the processing circuitry 320.

The processing circuitry 320 may be configured to perform data processing, control function execution and/or other processing and management services according to an example embodiment of the present invention. In some embodiments, the processing circuitry 320 may be embodied as a chip or chip set. In other words, the processing circuitry 320 may comprise one or more physical packages (e.g., chips) including materials, components and/or wires on a structural assembly (e.g., a baseboard).

In an example embodiment, the processing circuitry 320 may include one or more instances of a processor 322 and memory 324 that may be in communication with or otherwise control a device interface 340 and, in some cases, a user interface 350. As such, the processing circuitry 320 may be embodied as a circuit chip (e.g., an integrated circuit chip) configured (e.g., with hardware, software or a combination of hardware and software) to perform operations described herein.

The user interface 350 (if implemented) may be in communication with the processing circuitry 320 (directly or via the device interface 340) to receive an indication of a user input at the user interface 350 and/or to provide an audible, visual, mechanical or other output to the user. As such, the user interface 350 may include, for example, a display, one or more buttons or keys (e.g., function buttons), and/or other input/output mechanisms (e.g., keyboard, microphone, speakers, cursor, joystick, lights and/or the like). The user interface 350 may display or otherwise provide an output of information indicating an identity or certain characteristics of an object, instructions for interacting with the object (e.g., in terms of process order, angle, torque, and/or the like), feedback regarding interface with the object, etc. As such, for example, the user interface 350 may provide an output indicating when a nut is being approached out of order or from the wrong angle, or indicating that the proper torque has been reached. Various data sets of image data gathered by the motion monitor 300 may therefore be processed and information associated therewith may be presented on a display of the user interface 350 based on instructions executed by the processing circuitry 320 for the analysis of the data according to prescribed methodologies and/or algorithms. Moreover, in some cases, the user interface 350 may include options for selection of one or more reports to be generated based on the analysis of a given data set. In an example embodiment, the motion monitor 300 may not include a user interface 350, or the user interface 350 may be external and may be mated with the motion monitor 300 via the device interface 340.

The device interface 340 (if employed) may include one or more interface mechanisms for enabling communication with the various internal and/or external devices of the motion monitor 300 and/or with which the motion monitor 300 communicates. In some cases, the device interface 340 may be any means such as a device or circuitry embodied in either hardware, or a combination of hardware and software that is configured to receive and/or transmit data from/to devices in communication with the processing circuitry 320. In some cases, the device interface 340 may include one or more ports for external component connectivity and/or communication. Standard ports such as USB, other data ports, or power cable ports may be provided. However, in some cases, the ports may be for proprietary connectivity mechanisms. In some embodiments, the device interface 340 may include antennas, radio equipment and/or the like to enable the motion monitor 340 to interface with other components or devices wirelessly. Otherwise, wired communication, or combinations of wired and wireless communication, may be employed.

In an exemplary embodiment, the memory 324 may include one or more non-transitory memory devices such as, for example, volatile and/or non-volatile memory that may be either fixed or removable. The memory 324 may be configured to store information, data, applications, instructions or the like for enabling the motion monitor 300 to carry out various functions in accordance with exemplary embodiments of the present invention. For example, the memory 324 could be configured to buffer input data for processing by the processor 322. Additionally or alternatively, the memory 324 could be configured to store instructions for execution by the processor 322. As yet another alternative, the memory 324 may include one or more databases that may store a variety of data sets indicative of features or characteristics of data that can be correlated to corresponding parameters. For example, data captured by the first and second cameras 140 and 145 may be used for calibration and/or for determining the position of one or more objects relative to a reference triplet or quad. Thus, in some cases, the memory 324 may store information associated with patterns, image data, feature vectors, histograms, processing algorithms and/or the like to be employed for the execution of example embodiments. Among the contents of the memory 324, applications may be stored for execution by the processor 320 in order to carry out the functionality associated with each respective application. In some cases, the applications may include directions for control of the motion monitor 300 to generate and/or employ analytical tools for analyzing image data to determine positions, tracking and/or motion history as described herein. In some cases, the applications may further include directions for generating outputs, alerts and/or reports associated with analysis of image data as described herein.

The processor 322 may be embodied in a number of different ways. For example, the processor 322 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 322 may be configured to execute instructions stored in the memory 324 or otherwise accessible to the processor 322. As such, whether configured by hardware or by a combination of hardware and software, the processor 322 may represent an entity (e.g., physically embodied in circuitry—in the form of processing circuitry 320) capable of performing operations according to embodiments of the present invention while configured accordingly. Thus, for example, when the processor 322 is embodied as an ASIC, FPGA or the like, the processor 322 may be specifically configured hardware for conducting the operations described herein. Alternatively, as another example, when the processor 322 is embodied as an executor of software instructions, the instructions may specifically configure the processor 322 to perform the operations described herein.

In an example embodiment, the processor 322 (or the processing circuitry 320) may be embodied as, include or otherwise control the motion monitor 300 (or components thereof). As such, in some embodiments, the processor 322 (or the processing circuitry 320) may be said to cause each of the operations described in connection with the motion monitor 300 (or components thereof) by directing the motion monitor 300 (or respective components) to undertake the corresponding functionalities responsive to execution of instructions or algorithms configuring the processor 322 (or processing circuitry 320) accordingly.

In an example embodiment, the motion monitor 300 may therefore be any means such as a device or circuitry embodied in either hardware, or a combination of hardware and software that is configured to perform the corresponding functions of the motion monitor 300 as described herein under the control of the processing circuitry 320. In an example embodiment, the motion monitor 300 may be configured to perform various actions associated with learning monitoring zones and monitoring tool motion relative to the monitoring zones.

In an example embodiment, a series of data points may be stored to define a tracking operation of the one or more objects. Having captured and recorded the motion of the one or more objects, the processing circuitry 320 (e.g., via the processor 322) may determine a path traveled by the power tool 120. The path may be stored, with a plurality of other paths, to define an average path, or a movement zone inclusive of a plurality (or all) of the paths. In an example embodiment, the movement zone may be a substantially cylindrically shaped volume that includes the paths. Thus, for example, the movement zone may define an acceptable path for approaching an object. Different movement zones may be defined for each of a plurality of objects. Moreover, the ordering and torque values to be employed with respect to such movement zones may also be defined for each of the objects.

In some cases, the movement zones may be further defined on an operator-by-operator basis. Thus, for example, the operator or user of a given power tool may be registered to the motion monitor 300. An RFID tag of the operator may be read in association with a corresponding tag of the power tool 120 to register the operator to the power tool 120 (or vice versa). Thereafter, motion of the power tool 120 may be tracked and recorded in a database as tool motion associated with the corresponding operator. All tool motion measured for the power tool 120 may thereafter be associated with the operator.

In an example embodiment, the movement zone for a given object may be monitored relative to movement of the power tool 120 to ensure that the movement of the power tool 120 stays within the movement zone. Thus, for example, if the operator is to fasten ten bolts in a specific order and to corresponding specific torque values, the motion monitor 300 may measure or track motion of the power tool 120 toward a given object. If the motion in the first instance is toward the wrong object, the motion of the power tool 120 may be outside the movement zone for the first object to be approached. The motion monitor 300 may identify the violation of the movement zone and the power tool 120 may be deactivated and/or or the vision system monitor 130 or display of the user interface 350 may provide feedback indicating that the wrong object is being approached. Even if motion is toward the correct object, the movement of the power tool 120 in approaching the object may be tracked to ensure that such motion stays within the volume defined as the movement zone. If the motion stays within the movement zone, the power tool 120 may operate normally and the proper torque may be applied. However, if the motion of the power tool 120 strays outside the movement zone, the power tool 120 may be deactivated and/or or the vision system monitor 130 or display of the user interface 350 may provide feedback indicating that the power tool 120 has violated a boundary of the movement zone.

In some examples, the feedback provided (e.g., via the vision system monitor 130 or display of the user interface 350) may actually show the correct object (e.g., bolt) to approach, if the wrong object is being approached. Alternatively or additionally, the feedback may include an explanation of the reason for display of the feedback. For example, an indication that the wrong bolt has been approached, or an indication that the wrong angle of approach has been taken may be displayed. In some cases, the feedback may be binary or relatively basic in nature such as by providing a green light if the approach to a bolt stays within the movement zone for the bolt, or a red light if the approach to the bolt violates a boundary of the movement zone.

Figure 4:
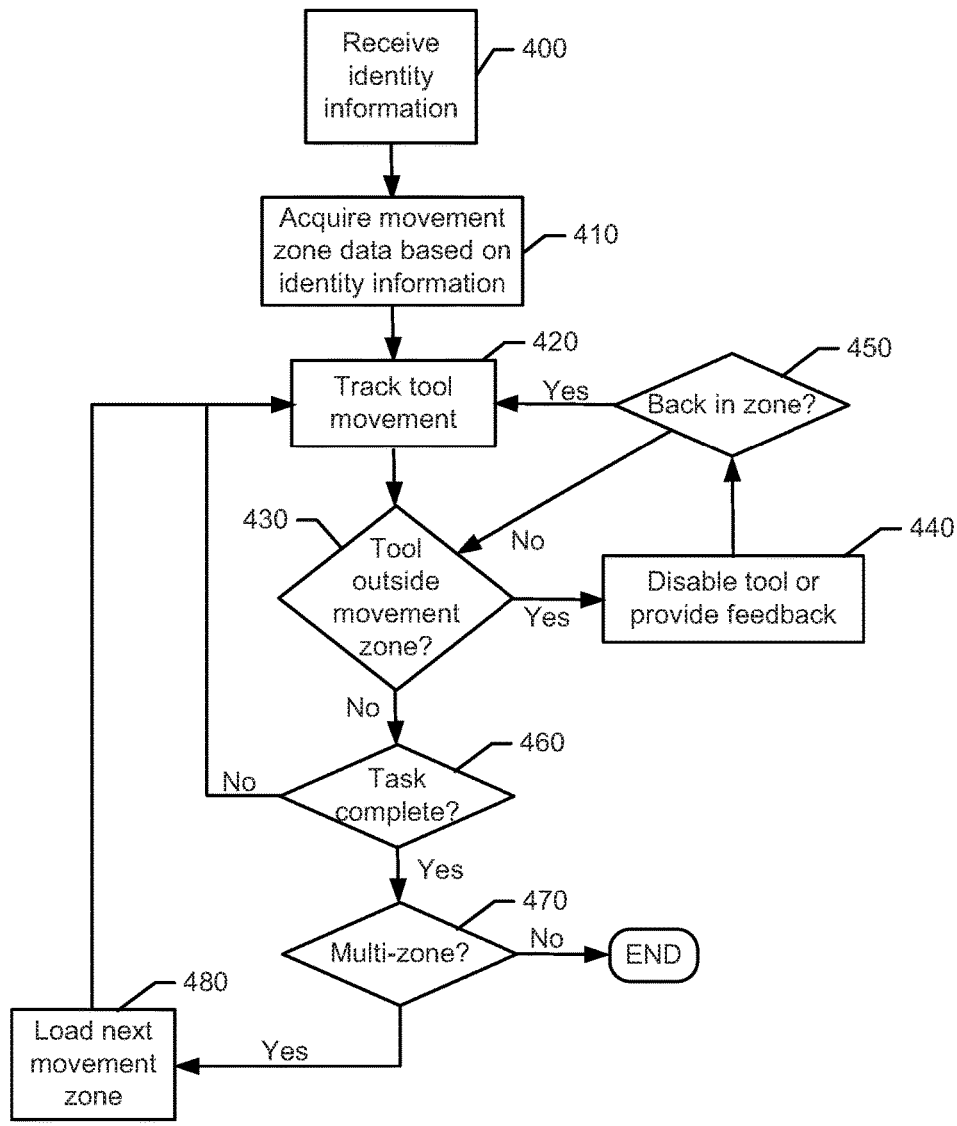
FIG. 4 illustrates a block diagram of a tool tracking operation in accordance with an example embodiment.

FIG. 4 illustrates a block diagram of a tool tracking operation in accordance with an example embodiment. As shown in FIG. 4, the tool tracking operation may include an initial receipt of identity information at operation 400. The identity information may include tool and/or operator identity. At operation 410, retrieval of data defining at least one movement zone based on the identity information may be accomplished. In some cases, multiple ordered movement zones in accordance with a job profile or other program for performing multiple tightening or similar operations may be included in connection with operation 410. Thereafter, tool tracking may be performed at operation 420. A determination may then be made as to whether the tool is staying within the movement zone at operation 430. As discussed above, this may include the definition of a substantially cylindrical volume (having corresponding boundaries) in the 3D environment of the work area and a monitoring of the 3D motion of the tool in such 3D environment relative to the boundaries of the cylindrical volume.

If the tool is outside the movement zone, then the tool may be disabled or feedback provided to the operator at operation 440. A determination may then be made as to whether the tool is back in zone at operation 450. If the tool is back in zone, continued tracking of tool movement may occur as in operation 420. However, if the tool is not back in zone, then the actions for tool movement being out of zone (e.g., at operation 430) may be repeated.

If the tool has remained or is currently in the movement zone, a determination may be made as to whether the corresponding task is complete at operation 460. Such determination may be made based on tool motion, or based on torque or other external parameters fed into the system. If a completion torque is defined for a given operation, receipt of an indication that the completion torque is achieved may trigger satisfaction of the check on task completion. If the task is not complete, operation may cycle back to tracking of tool movement at operation 420 so that the tool motion and parameters relevant to measuring task completion can be continuously monitored until the task is successfully completed. If the task is completed, then a determination may be made at operation 470 as to whether there are additional movement zones to monitor. If there are multiple zones, then the next movement zone may be loaded at operation 480 and the process flow may return to operation 420. If there are no further zones to monitor, then the control flow may terminate.

Given that the movement zones may be defined on an operator-by-operator basis, it can be appreciated that the movement zones may be slightly different for each operator. Thus, it can be further appreciated that it may be desirable for the motion monitor 300 to be configured or configurable to learn movement zones for each operator, or in general. In order for the motion monitor 300 to have this capability, some example embodiments may employ a learning mode for the motion monitor 300. In the learning mode, the motion monitor 300 may track and record motion (by a particular operator) relative to the performance of a task (e.g., a tightening operation). If the task is completed successfully, which may be indicated by the proper torque ultimately being applied, the motion data for the successful operation may be recorded in a learning data set. The learning data set may be grown until it includes data from a predetermined number of successful operations (e.g., ten) or a predetermined number of operations having data that defines paths remaining within a threshold distance of each other.

In some cases, a typical cycle time (e.g., the time it takes an operator to transit the movement zone to perform a tightening operation) may be around 3 seconds. Given the limited cycle time, a corresponding limited number (e.g., less than about 100 in some cases) may be obtainable for each operation. As such, data clustering may be performed relative to all the data provided (generally or for a particular operator) to determine which data sets include data defining paths within the threshold distance. When sufficient data is received, the movement zone may be calculated and associated with the object and/or with the operator.

In some embodiments, a measure of fit quality may be made based on entropy. In such embodiments, data portions selected to define movement zones while in the learning mode may be incrementally changed to continuously look for the best data to use for defining the movement zone. This process may help mitigate the fact that for relatively small data sets, it can be hard to minimize errors. Thus, only selected data (e.g., the best fit data) may be used for the learning mode to define movement zones.

In an example embodiment, different movement zones may be defined and learned for a plurality of objects, tools and operators. Thus, a first set of movement zones may be defined for one type of engine and a second set of movement zones may be defined for another type of engine. Subsets of movement zones may be defined for each object (e.g., each corresponding bolt on the engine) and in some cases, further subsets may be defined for each operator.

Figure 5:
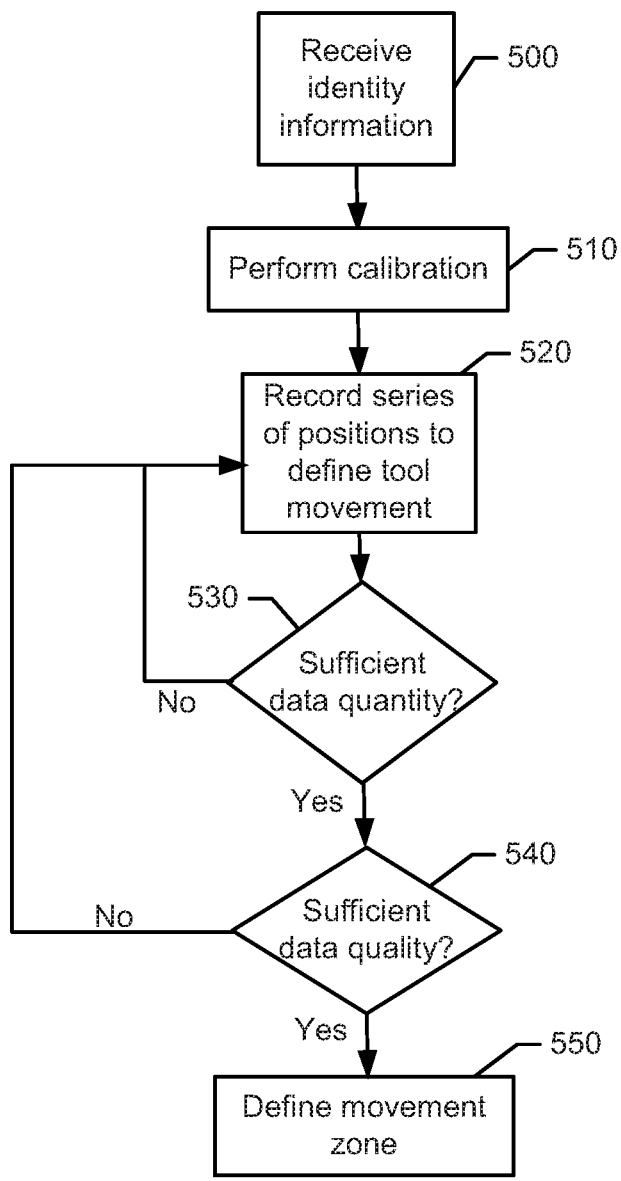
FIG. 5 illustrates a block diagram of operation of the motion monitor in a learning mode in accordance with an example embodiment.

FIG. 5 illustrates a block diagram of a learning mode operation to define a movement zone in accordance with an example embodiment. As shown in FIG. 5, the learning mode may begin after an initial receipt of identity information at operation 500. The identity information may include tool and/or operator identity. At operation 510, calibration may be performed (e.g., as described above, using the reference quad). However, it should be appreciated that calibration could be performed at any step of learning or tracking/monitoring modes. Thereafter, a series of tool positions may be recorded to define tool movement at operation 520. As such, a data set may be gathered including a plurality of points in 3D space. A determination may then be made as to whether the data set has sufficient data quantity (e.g., enough successful operations to provide sufficient data to define a movement zone) at operation 530. If there is not sufficient data quantity, flow may return to operation 520 for another iteration until sufficient data quantity is reached. When sufficient data quantity is achieved, a determination may be made as to whether sufficient data quality has been achieved. The measure of data quality may be performed, as discussed above, based on entropy and/or clustering to determine fit quality. If there is sufficient fit quality, then the movement zone may be defined at operation 550. However, if there is not sufficient fit quality, then flow may return to operation 520 until there is sufficient fit quality, or sufficient quantity of data having sufficient fit quality. Of note, the order of operations 530 and 540 could be reversed in some cases, or only one such operation may be performed. When the movement zone is defined, the movement zone may be defined as a substantially cylindrical volume (having corresponding boundaries) in the 3D environment of the work area. The boundaries may be defined by the maximum allowable deviation from an average or best fit path.

As discussed above, multiple tools may be employed in some embodiments. In some cases, when multiple tools are tracked, each tool may be identified separately (e.g., based on RFID tags). Some RFID tags may be tracked to around an accuracy of about 1 ft in a 3D environment. In some cases, an LED associated with each tool may be unique (e.g., based on pattern, color or frequency of flash), and such unique characteristics may be used to distinguish the LED and therefore the tool, along with the RFID. RFID tags may also be provided on reference plates. Thus, the motion monitor 300 may combine two tracking systems (e.g., a gross RFID tracking system and a fine LED tracking system) when the tools generally maintain some spatial separation. The combined tracking system may then be used to individually and simultaneously track a plurality (e.g., 10 or more) tools in a single environment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vision system comprising:
   a first camera and a second camera mounted for stereoscopic monitoring of a work environment;
   a support platform for support of a workpiece in the work environment;
   a first reference plate operably coupled to the support platform to provide a first frame of reference for three dimensional location of objects in the work environment;
   a power tool operable in the work environment under control of a tool controller; and
   a motion monitor operably coupled to the first and second cameras to determine location of the tool in the work environment based on a comparison of a reference point on the tool to a position of reference points on the reference plate,
   wherein a perspective view of the support platform by the first and second cameras is changeable, and
   wherein the system further comprises a second reference plate to define a second frame of reference for three dimensional location of objects responsive to the perspective view of the support platform being changed.

2. The vision system of claim 1, wherein the first and second cameras are static and the support platform is dynamic.

3. The vision system of claim 2, wherein the first reference plate lies in a first plane and the second reference plate lies in a second plane, and wherein an angular difference between the first and second planes is substantially equal to an amount of rotation of the support platform to change the perspective view.

4. The vision system of claim 1, wherein the first reference plate includes a first pattern of reference points thereon and the second reference plate includes a second pattern of reference points thereon, the first and second patterns being different.

5. The vision system of claim 4, wherein the first and second patterns are defined by different geometric shapes.

6. The vision system of claim 5, wherein the different geometric shapes comprise different types of triangles.

7. A vision system comprising:
a first camera and a second camera mounted for stereoscopic monitoring of a work environment;
a support platform for support of a workpiece in the work environment;
a reference plate operably coupled to the support platform to provide a frame of reference for three dimensional location of objects in the work environment;
a power tool operable in the work environment under control of a tool controller; and
a motion monitor operably coupled to the first and second cameras to determine location of the tool in the work environment based on a comparison of a reference point on the tool to a position of reference points on the reference plate,
wherein the reference plate comprises at least four reference points distributed thereon, and
wherein the motion monitor is configured to perform automatic configuration based on the at least four reference points using the same spectrum used to determine the location of the tool.

8. The vision system of claim 7, wherein the same spectrum comprises infrared spectrum.

9. The vision system of claim 7, wherein the automatic configuration is performed during object tracking associated with determining the location of the tool.

10. The vision system of claim 7, wherein three of the reference points form a triangle, and a fourth reference point is located spaced apart from a nearest leg of the triangle such that the at least four reference points form a quadrilateral.

11. A vision system comprising:
a first camera and a second camera mounted for stereoscopic monitoring of a work environment;
a support platform for support of a workpiece in the work environment;
a reference plate operably coupled to the support platform to provide a frame of reference for three dimensional location of objects in the work environment;
a power tool operable in the work environment under control of a tool controller; and
a motion monitor operably coupled to the first and second cameras to determine location of the power tool in the work environment based on a comparison of a reference point on the tool to a position of reference points on the reference plate,
wherein the motion monitor is configured to monitor the location of the power tool relative to a movement zone defining a volume in three dimensional space.

12. The vision system of claim 11, wherein the movement zone defines a cylindrical volume of permissible tool locations as the power tool approaches an object on the workpiece.

13. The vision system of claim 11, wherein the movement zone is generated base on a learning mode in which the movement zone is defined based on a plurality of monitored tool movements.

14. The vision system of claim 13, wherein the learning mode has a quality threshold relative to data monitored prior to allowing the movement zone to be generated.

15. The vision system of claim 13, wherein the learning mode has a quantity threshold relative to data monitored prior to allowing the movement zone to be generated.

16. The vision system of claim 11, wherein the power tool is disabled responsive to a determination that the power tool violates a boundary of the movement zone.

17. The vision system of claim 11, wherein feedback regarding operation of the power tool is provided to an operator responsive to a determination that the power tool violates a boundary of the movement zone.

18. The vision system of claim 17, wherein the boundary is defined as a maximum allowable deviation from an average or best fit path of the power tool.

19. The vision system of claim 11, wherein selected data stored during determining tool location is used for determining the movement zone.

20. The vision system of claim 11, wherein a linear indicator is provided on the power tool, the linear indicator being detectable by the first and second cameras to define a direction of extension of a socket or adapter of the power tool.

* * * * *